(12) United States Patent
Handler et al.

(10) Patent No.: US 11,586,993 B2
(45) Date of Patent: Feb. 21, 2023

(54) TRAVEL SERVICES WITH DIFFERENT RATE CATEGORIES

(71) Applicant: Inspirato LLC, Denver, CO (US)

(72) Inventors: Brad Handler, Denver, CO (US);
Cody Holloway, Denver, CO (US);
Brent Handler, Englewood, CO (US)

(73) Assignee: INSPIRATO LLC, Denver, CO (US)

( * ) Notice: Subject to any disclaimer, the term of this patent is extended or adjusted under 35 U.S.C. 154(b) by 165 days.

(21) Appl. No.: 16/677,724

(22) Filed: Nov. 8, 2019

(65) Prior Publication Data

US 2021/0142232 A1 May 13, 2021

(51) Int. Cl.
*G06Q 10/02* (2012.01)
*G06Q 20/12* (2012.01)
*G06Q 30/0204* (2023.01)
*G06N 20/00* (2019.01)

(52) U.S. Cl.
CPC ......... *G06Q 10/025* (2013.01); *G06Q 20/127* (2013.01); *G06Q 30/0205* (2013.01); *G06N 20/00* (2019.01)

(58) Field of Classification Search
CPC ............... G06Q 10/025; G06Q 20/127; G06Q 30/0205; G06N 20/00
See application file for complete search history.

(56) References Cited

U.S. PATENT DOCUMENTS

| 6,173,209 B1* | 1/2001 | Laval | G06Q 10/02 235/382 |
| 2002/0038250 A1* | 3/2002 | Heintzeman | G06Q 30/02 705/5 |
| 2005/0137934 A1* | 6/2005 | Handler | G06Q 30/02 705/5 |
| 2006/0155603 A1* | 7/2006 | Abendroth | G06Q 30/0213 705/14.15 |

(Continued)

FOREIGN PATENT DOCUMENTS

CN 114930369 8/2022

OTHER PUBLICATIONS

Feng, Ruomei, Member Segmentation and Value Network of a Paid Travel Club: A Perspective of Relationship Marketing, Purdue University, 2004.*

(Continued)

*Primary Examiner* — Nathan Erb
(74) *Attorney, Agent, or Firm* — Bryan Cave Leighton Paisner LLP

(57) ABSTRACT

Systems and methods are disclosed for providing a subscription-based travel service that includes one or more processors that perform operations comprising: receiving, by a subscription-based travel service, search criteria comprising a travel period for a user; determining that a subscription of the user with the subscription-based travel service corresponds to a first travel service rate category; identifying, based on the search criteria, a list of travel services associ- (Continued)

ated with the first travel service rate category that are available for consumption during the travel period; presenting the identified list of travel services to the user; and reserving a given travel service of the travel services on the list in response to receiving a selection of the given travel service.

20 Claims, 7 Drawing Sheets

(56) References Cited

U.S. PATENT DOCUMENTS

| | | | | |
|---|---|---|---|---|
| 2007/0011047 | A1* | 1/2007 | Daoudi | G06Q 30/02 |
| | | | | 705/14.25 |
| 2008/0201227 | A1* | 8/2008 | Bakewell | G06Q 30/0217 |
| | | | | 705/14.19 |
| 2011/0066648 | A1* | 3/2011 | Abhyanker | G06F 16/951 |
| | | | | 707/770 |
| 2012/0131050 | A1* | 5/2012 | Nagashima | G06Q 50/14 |
| | | | | 707/769 |
| 2017/0213161 | A1* | 7/2017 | Moati | G06Q 50/12 |
| 2017/0243310 | A1* | 8/2017 | Dawkins | G06Q 10/02 |
| 2018/0276573 | A1* | 9/2018 | Otillar | G06Q 10/02 |
| 2019/0065564 | A1* | 2/2019 | Twig | G06Q 10/025 |

OTHER PUBLICATIONS

"International Application Serial No. PCT US2020 055203, International Search Report dated Dec. 1, 2020", 4 pgs.

"International Application Serial No. PCT US2020 055203, Written Opinion dated Dec. 1, 2020", 6 pgs.

"International Application Serial No. PCT/US2020/055203, International Preliminary Report on Patentability dated May 19, 2022", 8 pgs.

"European Application Serial No. 20799951.7, Response to Communication pursuant to Rules 161 and 162 filed Oct. 4, 2022", 23 pgs.

* cited by examiner

FIG. 5

TRAVEL SERVICES WITH DIFFERENT RATE CATEGORIES

BACKGROUND

Web-based travel services systems allow a user to search through various travel services available by multiple providers. A user can specify a destination and travel time frame to find matching hotels, rental cars, and airfares along with their corresponding costs. The user can sort the results by price, type, and availability of the travel service. After the user finds a suitable hotel, rental car, or airfare, the user can utilize the web-based travel services to reserve the hotel, rental car, or airfare.

BRIEF DESCRIPTION OF THE DRAWINGS

Various ones of the appended drawings merely illustrate example embodiments of the present disclosure and should not be considered as limiting its scope.

FIG. 5 is an illustrative graphical user interface of the travel services system, according to some example embodiments.

DETAILED DESCRIPTION

Figure 1:
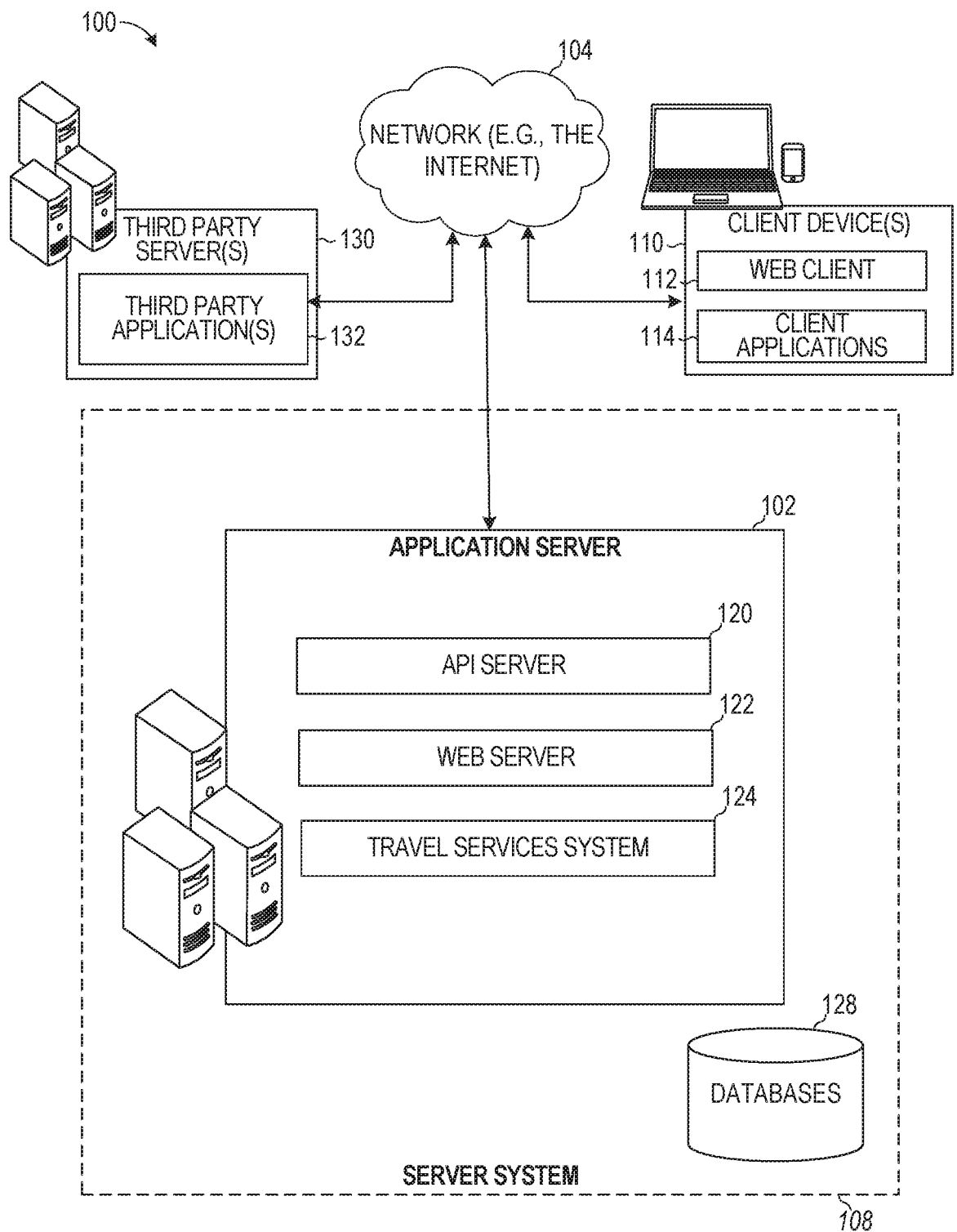
FIG. 1 is a block diagram illustrating a networked system for a subscription-based travel service, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Users typically spend a great deal of time and effort making travel arrangements, such as looking for hotels, airfares, and car rentals that are within their budget. Existing travel sites allow a user to input various travel criteria, such as travel dates and destinations, to search for all the available hotels, airfares, and car rentals that match the travel criteria. The existing travel sites also allow the user to sort and filter results based on a specified cost. While such existing travel sites generally work well for making travel arrangements, there is often a large disparity among cost and availability for the same or similar hotels, airfares, and car rentals across different travel sites. This ends up burdening the user as the user has to search through the available options across multiple travel sites to make sure he or she gets the best price within their budget. Searching through multiple travel sites takes a great deal of time and effort and forces the user to navigate through multiple pages of information and manually compare results to make travel arrangements. Even still, the travel arrangements the user finally settles on may not provide the user with the best available options for their budget.

In addition, once a user finally finds a desired travel service, reserving the travel service requires the user to complete a checkout process by navigating through many checkout screens. For example, the user has to first select the desired travel service, then input various personal information on another screen, then navigate to a payment screen to provide payment information, and finally, the user can confirm reservation for the desired travel service in a confirmation screen. This further adds to the inefficient use of system resources for making travel service reservations using traditional systems and wastes a user's time and effort.

The typical travel sites blindly aggregate or search through all of the available travel options across numerous websites of hotels, airlines, and car rental companies to generate as many different combinations as possible of travel options. This type of aggregation consumes a great deal of system processing and storage resources and substantially burdens networks and consumes bandwidth that can otherwise be used for other tasks. To address some of these issues, certain organizations install additional dedicated servers or services, which is costly and inefficient. Rather than blindly aggregating all of the available travel options, some travel sites perform a search across millions of different travel service options based on user supplied criteria. Such searches take a great deal of time and also consume a tremendous amount of system processing and storage resources. Because of the amount of time these searches take to complete, users end up either leaving the system altogether or being frustrated at the end result and may end up not making any travel reservations at all.

Some subscription-based travel services address the above issues and expedite presentation of travel service options by intelligently pre-aggregating various combinations of travel services based on a given set of factors. However, such travel services systems present users with travel service options that have fixed or predetermined durations, which may not match the needs of most users. Namely, users may desire to travel for a longer period of time than that offered by such systems but may not be able to make such reservations because of the fixed durations offered by such travel services.

The disclosed embodiments improve the efficiency of using an electronic device by providing more travel flexibility to users of a subscription-based travel services system to enhance and improve the way users conduct travel arrangements. The subscription-based travel service, according to the disclosed embodiments, allows a user to search for travel services and make reservations for travel services (e.g., such as hotels, rental cars, airfares, homes/residences, experiential travel, guided tours, cruises, train fares, private aviation, "glamping," bespoke travel, event-based travel, and/or space travel) for a fixed annual or monthly subscription fee. The user who is a subscriber to the subscription-based travel service is authorized to make an unlimited number of reservations for travel services without having to consider budgetary constraints and can search through the travel services very quickly with minimal delay. While certain embodiments are described with reference to travel services, similar functionality can be applied to sporting event tickets, event tickets, concert tickets, entertainment tickets, and restaurant reservations. In such cases, a subscription service can be provided that allows a user to pay a monthly or annual subscription fee and make an unlimited number of reservations for sporting event tickets, event tickets, entertainment tickets, concert tickets, and restaurant reservations without having to consider budgetary constraints.

In an embodiment, the disclosed travel service receives registration information from the user to subscribe to the subscription-based travel service. The registration information includes a selection of a first travel service rate category from a plurality of travel service rate categories. The first travel service rate category allows the user to reserve, for a first subscription fee, for consumption during a first predetermined time period, any travel service associated with the first travel service rate category. As an example, the first travel service rate category allows the user to reserve a three-night stay at any hotel of a hotel brand associated with the first hotel rate category. A second travel service rate category of the plurality of travel service rate categories allows the user to reserve, for a second subscription fee, for consumption during the first predetermined time period, any travel service associated with the second travel service rate category and for consumption during a second predetermined period of time, any travel service associated with the first travel service rate category. As an example, the second travel service rate category allows the user to reserve a four-night stay at any hotel of a hotel brand associated with the first hotel rate category and a three-night stay at any hotel of a hotel brand associated with the second hotel rate category.

The disclosed travel service determines that a subscription of the user with the subscription-based travel service corresponds to the first travel service rate category and identifies, based on the search criteria provided by the user, a list of travel services associated with the first travel service rate category that are available for consumption during the travel period. For example, the travel service identities a list of hotel brands associated with the first hotel rate category that have a hotel with a three-night stay available during the dates specified by the user. In some cases, the list of hotel brands is limited to those hotel brands with hotels that are within a threshold distance, such as 10 miles, of a location or destination specified by a user. The identified list of travel services is presented to the user and a given travel service of the travel services on the list is reserved in response to receiving a selection of the given travel service. In some cases, the disclosed travel service allows the user to purchase additional nights at a hotel within a set of hotel brands associated with a higher rate category than the first travel service rate category.

Reserving a desired travel service according to the disclosed techniques can be performed very quickly and efficiently by selection of a reservation option. Reserving the desired travel service can be performed without navigating through multiple checkout and payment screens as the payment and user information needed to reserve the travel service is performed using the subscription information and subscription payments made by the subscriber. Specifically, the disclosed embodiments store various personal information about a user in a user profile and receive subscription payments from the subscribers. In this way, the disclosed embodiments can very quickly automatically reserve and pay for a user selected travel service using the previously stored personal information and the previously provided subscription payments, thereby avoiding the need to navigate the user through a checkout process.

In this way, the amount of time and effort the user has to spend searching for travel services that meet the user's budget are significantly reduced. In addition, because the travel services are limited to those that fall within a certain travel service rate category, system resources are used more efficiently than traditional travel services systems. Also, by providing a single interface and travel site for making travel arrangements that automatically consider various travel service costs in providing travel services options to the user and that store personal user information and received subscription payments, the number of steps, pages, and interfaces the user has to navigate through to make travel arrangements are reduced. This provides a better way for a user to consume travel. Namely, the user does not need to search through multiple travel sites and pages of information to find travel arrangements that satisfy the user's needs.

FIG. 1 is a block diagram illustrating a networked system 100 for a subscription-based travel service, according to some example embodiments. The system 100 includes one or more client devices such as client device 110. The client device 110 comprises, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 comprises a display module to display information (e.g., in the form of graphical user interfaces). In further embodiments, the client device 110 comprises one or more of touch screens, accelerometers, gyroscopes, cameras, microphones, global positioning system (GPS) devices, and so forth. The client device 110 may be a device of a user that is used to access and utilize subscription-based travel services via a travel services system 124 implemented by an application server 102.

For example, the client device 110 may be used by a user to navigate to a website of the travel services system 124. In some embodiments, the client device 110 may include a dedicated travel services system 124 application with the same or similar functionality as the website. After accessing the website or the application on the client device 110, the user inputs personal information (e.g., name, address, phone number, payment information, geographical location, home address, and so forth) to access the travel services system 124.

In some embodiments, access to the travel services system 124 requires a subscription fee to be paid. The subscription fee is paid monthly but can be paid on any other periodic or non-periodic interval (e.g., weekly, daily, every other month, annually, lifetime, and so forth). After subscribing to the travel services system 124 by paying a periodic subscription fee, the user is provided with login credentials that can be used to navigate and browse available travel services on the travel services system 124 and reserve or book travel services. For example, the user can access the travel services system 124 to browse hotel rooms available in various luxury categories in a selected geographical location on a particular date or range of dates. The travel services are pre-aggregated (e.g., the combinations of travel services are created before user search criteria is received) and the user searches through the pre-aggregated travel services. This reduces the amount of system resources required to find travel services that meet user search criteria and also expedites the presentation of results. Also, the pre-aggregated travel services are associated with costs that may be lower than the off-the-shelf cost of purchasing such travel services ad hoc. Namely, because the user is limited to searching through pre-determined combinations of travel services on the subscription-based travel service, such travel services can be provided at a lower cost than if the user were to search for the same travel services and make their own combination using a non-subscription based traditional travel site.

In some embodiments, after the user activates their subscription, the client device 110 presents a graphical user interface with data entry regions allowing the user to select from a predefined list of travel destinations (e.g., at various geographical locations) available on a travel date input by the user. The graphical user interface allows the user to manually type in a name of a desired geographical location destination and the desired travel date (e.g., the date the user plans to take the trip and consume the travel service and/or the length of time for the trip). As the user types in the name of the desired geographical location destination, the travel services system 124 searches through the predetermined combinations of travel destinations available on the travel date that are at or within a specified threshold distance of (e.g., default threshold of 10 miles or user provided threshold) the desired geographical location(s) and presents the available travel destinations to the user for selection. In some cases, the list of travel services that are presented to the user are selected based on a likelihood that the user will consume (e.g., reserve or book) the travel services.

In response to receiving a user selection of one or more of the travel destinations, prior to or during selection of the destination, the client device 110 presents a data entry region for the user to input a specific travel start date (e.g., an arrival date at the hotel) and a number of days for the trip. In some embodiments, the list of available travel services is automatically searched for on a daily basis without receiving the user selection of the travel destination and/or travel start date. The travel services system 124 retrieves subscription information for the user specifying the travel service rate category for the user.

The travel services system 124 provides matching travel services results to the client device 110 for presentation in the graphical user interface using one or more interactive visual representations. The graphical user interface of the client device 110 may be utilized to access reviews, comments, and additional information for each of the travel services represented by the interactive visual representations.

The client device 110 receives a user input selecting one of the interactive visual representations for a travel service and communicates the selection to the travel services system 124. The travel services system 124 automatically reserves the travel service (e.g., holds and pays for a room at a hotel) corresponding to the selected interactive visual representation. This is performed without navigating the user through a checkout process. The client device 110 may present a confirmation page to the user informing the user of the travel service that has been reserved and the travel start date.

In some implementations, the travel services system 124 may limit the number of concurrent travel services the user can reserve. For example, the travel services system 124 may allow the user to select only one travel service reservation at a time, such that the user is prevented from searching for and/or reserving additional travel services until the currently selected travel service that has been reserved expires, is consumed, or is canceled. As another example, the travel services system 124 may only allow the user to reserve three travel services at a time, such that when one of the three travel services expires, the user can reserve an additional travel service. Namely, after the start and end dates for the travel service elapse, indicating that the user has utilized or consumed the travel service, the client device 110 may allow the user to search for additional travel services to reserve in a similar manner as before if the user's subscription is still active. Alternatively, the user can navigate to a cancelation page or graphical user interface using the client device 110 and cancel any reservations previously selected within a cancelation window within 72 hours prior to the travel start date). In response to receiving a user request to cancel the travel service, the travel services system 124 may cancel the reservation and the client device 110 may allow the user to search for and reserve a new travel service in a similar manner as before.

In some embodiments, the travel services system 124 provides an improved way to allow users to make travel reservations using a subscription-based travel system. The travel services system 124 performs such improved techniques in various phases or steps. Initially, the travel services system 124 generates an inventory of travel services by searching travel destinations across a range of dates or specific dates throughout the year between the start and end dates of a user's subscription. The travel destinations are searched from publicly available information sources (e.g., databases of other travel sites available to non-subscribers of the travel services system 124), by direct access to a predetermined set of travel services, third party sources, proprietary sources, and travel services that have direct relationships and contracts for travel services with the travel services system 124. The travel destinations are searched periodically (e.g., nightly or weekly) using various combinations of travel dates and destinations. The search returns a predetermined list of travel services available at various dates throughout the world and includes the total cost for consuming the travel services on the particular combination of dates along with the cancelation policy of each travel service. The cancelation policy may indicate the tee for canceling the travel service once booked, which may be free or a nominal charge.

As a result, the output of phase one or step one is a collection or database of tens of millions of combinations of travel services (and travel service types), at different ranges of travel start dates, with corresponding prices or costs, and with corresponding cancelation policies. In some embodiments, the travel services system 124 categorizes the travel services into various travel service rate categories. In some implementations, each travel service rate category represents travel services that are associated with a specified range of costs. For example, a first travel service rate category may represent a first collection of travel services that, on average, cost between $100-$200 per night and a second travel service rate category (that is of a higher tier than the first travel service rate category) may represent a second collection of travel services that, on average, cost between $201-$300 per night. In some implementations, each travel service rate category represents travel services that are associated with one or more brands (e.g., brands of hotels, brands of car rental companies, brands of cruises, and so forth). For example, a first travel service rate category may represent a first collection of hotels that are associated with a classic luxury brand (e.g., Ritz-Carlton and St. Regis hotel brands) and a second travel service rate category (that is of a higher tier than the first travel service rate category) may represent a second collection of hotels that are associated with a distinctive luxury brand (e.g., Luxury Collection, W Hotels, and Edition hotel brands).

In some embodiments, the travel services system 124 receives user input specifying travel information including a travel destination and travel start and end dates. The travel services system 124 determines a travel service rate category associated with a subscription for the user. In some cases, the travel services system 124 identifies a travel time period associated with the subscription of the user and determines whether the start and end dates input by the user exceed the travel time period. For example, the user's subscription may allow the user to consume travel services for a three-night duration. In such cases, the travel services system 124 determines whether the start and end dates input by the user exceed the three-night duration. If so, the travel services system 124 prompts the user to reduce or change the desired travel duration. Alternatively, the travel services system 124 presents the user with an option to purchase additional days/nights based on a difference between the travel time period associated with the user's subscription and the travel duration input by the user.

After receiving the travel information from the user, the travel services system 124 searches the collection of travel services within range of the travel destination that are associated with the travel service rate category of the user's subscription to find travel services that are available for consumption during the travel start and end dates. For example, the travel services system 124 determines that the user's subscription is associated with the classic luxury brand of hotels and, in response, the travel services system 124 limits the search to the hotels categorized under the classic luxury brand. The travel services system 124 determines whether the hotels have availability for the user to stay during the desired travel duration. The travel services system 124 presents the filtered list of travel services as options for the user or subscriber to select to make a reservation. The user can further filter the list based on various criteria (e.g., rating, reviews, and so forth). In response to receiving a user selection of a given travel service in the list, the travel services system 124 reserves the given travel service automatically and without navigating the user to a checkout screen or process.

In some embodiments, after receiving the travel information from the user, the travel services system 124 searches the collection of travel services within range of the travel destination that are associated with the travel service rate category of the user's subscription to find travel services that are available for consumption during the travel start and end dates. In addition, the travel services system 124 searches the collection of travel services within range of the travel destination that are associated with another (higher tier) travel service rate category than the rate category of the user's subscription to find travel services that are available for consumption during a shorter time period than the travel start and end dates input by the user. For example, the travel services system 124 determines that the user's subscription is associated with the distinctive luxury brand of hotels and, in response, the travel services system 124 limits the search to the hotels categorized under the distinctive luxury brand for the requested 3-night stay. In addition, the travel services system 124 searches hotels categorized under the classic luxury brand (a higher tier category than the distinctive luxury brand) for a 2-night stay shorter duration of travel than the 3-nights requested by the user). The travel services system 124 presents both collections of results (e.g., those hotels that are associated with the first rate category and the hotels associated with the second rate category). The travel services system 124 displays an indicator to visually distinguish those travel services associated with the first rate category from those associated with the second rate category.

In some cases, the travel services system 124 adds more flexibility for the subscriber to make travel reservations by presenting an option to extend the travel duration of a travel service associated with a higher tier rate category than the rate category of the user's subscription. This may be beneficial since the travel services that are presented as options to reserve to the user that are associated with the higher tier rate category than the user's subscription have a shorter travel duration available than that requested by the user. Namely, while both rate categories of travel services are presented to the user as options to reserve, only those travel services that are associated with the rate category of the user's subscription are available to be reserved for the user supplied travel duration. The other travel services associated with the higher tier rate category are available to be reserved for a shorter duration of travel. In such circumstances, if the user desires to reserve the travel service that is associated with a higher tier rate category than the user's subscription, the user can select the option to extend the travel duration of the desired travel service (e.g., to increase the travel duration from 2-nights available to be reserved under the user's subscription to 3-nights, which is the travel duration requested by the user). This option may be provided for each travel service that is presented to the user or for a selected subset of the travel services.

In some embodiments, the option to extend may be associated with a particular fee. The fee associated with the option to extend may be computed based on a cost of the given travel service. For example, the travel services system 124 may retrieve the cost of a given travel service representing the cost per day, week, month, or other specified interval that a non-subscriber of the travel services system 124 pays to reserve or consume the given travel service. In response to receiving a user selection of the option to extend, the travel services system 124 charges the subscriber the fee associated with the option to extend and reserves the higher tier category of travel service for the requested travel duration.

In some embodiments, the travel services system 124 is associated with a single hotel chain entity (a parent company) of multiple hotel brands of different hotel rate categories. In this way, the single entity has direct access to availability and pricing information for each of hotels that belong to the hotel brands. The user may become a subscriber to the travel services system 124 by creating a profile that includes personal information for the user and that selects a hotel rate category from the various hotel rate categories. In some embodiments, the travel services system 124 presents an interface that summarizes the hotel brands associated with each hotel rate category. The travel services system 124 informs the user about how many nights the user can stay per reservation per hotel rate category. For example, the travel services system 124 may present a message or prompt to the user indicating that a subscription to a first hotel rate category corresponds to a first subscription fee, which provides the user with options to reserve 3-nights stays at a time in hotels that are part of a first collection of the hotel brands and 2-nights stays at a time in hotels that are part of a second collection of the hotel brands. Similarly, the travel services system 124 may present a message or prompt to the user indicating that a subscription to a second hotel rate category corresponds to a second subscription fee (higher than the first subscription fee), which provides the user with options to reserve 3-nights stays at a time in hotels that are part of a second collection of the hotel brands and 4-nights stays at a time in hotels that are part of the first collection of the hotel brands. The subscription fee may vary by geographical region of the user, a classification (that is manually provided or automatically determined using machine learning) of the user, and/or other suitable criteria. After a user completes registration and pays the subscription fee, the user can log into the travel services system to begin making unlimited reservations at hotels corresponding to the hotel rate category of the user's subscription and for travel periods determined based on the user's subscription.

One or more users may be a person, a machine, or other means of interacting with the client device 110. In example embodiments, the user may not be part of the system 100 but may interact with the system 100 via the client device 110 or other means. For instance, the user may provide input (e.g., touch screen input or alphanumeric input) to the client device 110 and the input may be communicated to other entities in the system 100 (e.g., third-party servers 130, server system 108, etc.) via a network 104. In this instance, the other entities in the system 100, in response to receiving the input from the user, may communicate information to the client device 110 via the network 104 to be presented to the user. In this way, the user interacts with the various entities in the system 100 using the client device 110.

The system 100 further includes a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, messaging application, electronic mail (email) application, an e-commerce site application, a mapping or location application, an online home buying and selling application, a travel services application, a real estate application, and the like.

In some embodiments, one or more client applications 114 are included in a given one of the client device 110 and configured to locally provide the user interface and at least some of the functionalities, with the client application 114 configured to communicate with other entities in the system 100 (e.g., third-party servers 130, server system 108, etc.), on an as-needed basis, for data and/or processing capabilities not locally available (e.g., to access location information, to access travel services information, such as cost and availability, to authenticate a user, to verify a method of payment, etc.). Conversely, one or more applications 114 may not be included in the client device 110, and then the client device 110 may use its web browser to access the one or more applications hosted on other entities in the system 100 (e.g., third-party servers 130, server system 108, etc.).

A server system 108 provides server-side functionality via the network 104 (e.g., the Internet or WAN) to one or more third-party servers 130 and/or one or more client devices 110. The server system 108 includes an application server 102 that implements an application program interface (API) server 120, a web server 122, and a travel services system 124, that may be communicatively coupled with one or more databases 128. The one or more databases 128 may be storage devices that store data related to users of the system 108, applications associated with the system 108, cloud services, travel services data, one or more machine learning techniques and so forth. The one or more databases 128 may further store information related to third-party servers 130, third-party applications 132, client devices 110, client applications 114, users, and so forth. In one example, the one or more databases 128 may be cloud-based storage.

In one example, the one or more databases 128 may be cloud-based storage. The one or more databases 128 may store subscription information for one or more users of the travel services system 124. The subscription information may identify users of the travel services system 124, the subscription start dates of the users, the subscription end dates, the subscription fee of the users, the travel services rate category of the users' subscriptions, the geographical locations of the users, the total amount paid-to-date for a subscription of the users, and/or one or more travel services activities of the users. The travel services activities may include any combination of the number of reservations made in a given time period (e.g., within a given subscription year) by each user, the subscription duration (e.g., measured from the subscription start date to the present date) of each user, the booking duration (e.g., measured from the booking date to the travel date) of each user, the distance to the travel destination of each user (e.g., measured from an address of the user and the location of reserved travel destinations), the margin amount (e.g., how much profit was made in aggregate during the course of the subscription) for each user, the cancelation frequency (e.g., how often the user cancels a reservation made), and/or the reservation frequency (e.g., how much time elapses on average between the end of one reservation and the start of another).

The one or more databases 128 may store the reservations (e.g., the destination and the travel start date and/or duration) of travel services of each user or subscriber of the travel services system 124. The one or more databases 128 may store a list of all the available, or a selected set, of travel services in one or more geographical regions or destinations along with reviews and/or detailed information about the travel services. The one or more databases 128 may store the availability information for each travel service (e.g., dates on which a given travel services is available to be reserved for consumption), the travel services rate category of each travel service, and/or an identification of a brand associated with each travel service.

The one or more databases 128 may store the cancelation policy of each travel service indicating how much time in advance of the reservation start date at a given travel service the travel service reservation can be canceled without penalty (e.g., to receive a full refund). The one or more databases 128 may store the cost for canceling a given travel service outside of the cancelation policy.

The server system 108 may be a cloud computing environment, according to some example embodiments. The server system 108, and any servers associated with the server system 108, may be associated with a cloud-based application, in one example embodiment.

The server system 108 includes a travel services system 124. The travel services system 124 includes one or more modules, storage devices, and databases. The storage devices in the travel services system 124 store various travel services activities for each user, travel services activities training data, and one or more machine learning techniques for classifying users of the travel services system 124. The modules in travel services system 124 are configured to search for available travel services, corresponding to a given travel services rate category of a given user's subscription, to provide to the client device 110 in response to receiving a request for travel services at a given destination and time frame. The modules in travel services system 124 are configured to receive a user selection of one of the travel services matching the request and reserve the selected travel service for the user. The modules in travel services system 124 are configured to determine whether the number of pending reservations for a given user exceed an allowable number of pending reservations (e.g., more than one, or more than three) and, in response, prevent the user from making further reservations until the number of pending reservations is below the allowable number (e.g., by canceling a pending reservation or waiting for the reservation to expire). If the number of pending reservations does not exceed an allowable number of pending reservations, the modules in travel services system 124 are configured to automatically reserve the travel service selected by the user.

The modules in travel services system 124 are configured to train a machine learning technique to classify a given user or subscriber using the travel services activities of the user or subscriber by establishing relationships between known travel services activities and known or manually assigned classifications to users or subscribers. The modules in travel services system 124 are configured to filter the available travel services provided to a given client device 110 based on the classification of the user of the client device 110, subscription types, and/or cancelation policies of the various travel services. The details of the travel services system 124 are provided below in connection with FIG. 2.

The system 100 further includes one or more third-party servers 130. The one or more third-party servers 130 may include one or more third-party application(s) 132. The one or more third-party application(s) 132, executing on third-party server(s) 130, may interact with the server system 108 via API server 120 via a programmatic interface provided by the API server 120. For example, one or more the third-party applications 132 may request and utilize information from the server system 108 via the API server 120 to support one or more features or functions on a website hosted by the third party or an application hosted by the third party. The third-party website or application 132, for example, may provide software version analysis functionality that is supported by relevant functionality and data in the server system 108.

Third-party servers 130 may include an existing non-subscription-based travel service. Such non-subscription-based travel services can be used to search for travel services at a cost available to non-subscribers of the travel services system 124. The travel services system 124 may query the third-party servers 130 on a periodic basis to obtain the costs for the travel services provided by the travel services system 124. The costs may represent a per-night rate of the travel services multiplied by a predetermined number of nights (e.g., 6 nights).

Figure 2:
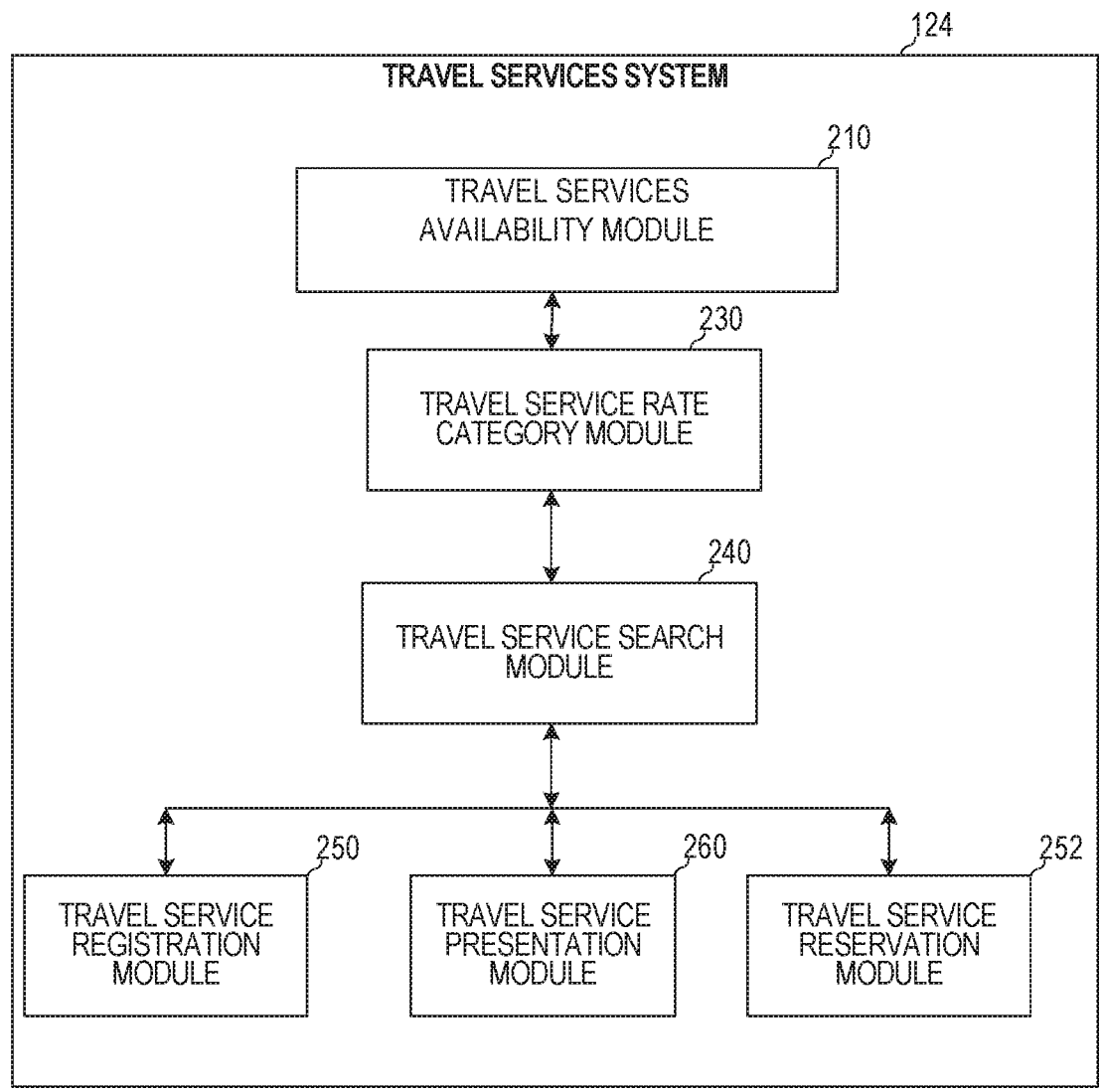
FIGS. 2 and 3 illustrate a travel services system, according to some example embodiments.

FIG. 2 illustrates a travel services system 124, according to some example embodiments. The travel services system 124 includes a travel services availability module 210, a travel service rate category module 230, a travel service search module 240, a travel service registration module 250, a travel service presentation module 260, and a travel service reservation module 252. In some implementations, some modules of the travel services system 124 may be implemented on server system 108 and others may be implemented on third party servers 130 or client device 110. In some implementations, all of the modules of the travel services system 124 are implemented on server system 108, on third party servers 130, and/or on client device 110. In such cases, server system 108 communicates information to third party servers 130 based on the modules implemented and vice versa.

The travel service registration module 250 communicates with a client device 110 to register a new subscriber with the travel services system 124. The travel service registration module 250 presents a graphical user interface that allows the user to input various personal information and to select a travel services rate category from the various travel services rate categories. For example, the user can input a name, address, billing information, and preferred destinations to build the profile for the user. The user can select a travel services rate category in a particular tier and pay a subscription corresponding to the selected category.

In some embodiments, the travel service registration module 250 presents an interface that summarizes the different travel services rate categories. For example, the travel service registration module 250 informs the user about how many nights the user can stay per reservation per travel services rate category. Specifically, the travel service registration module 250 may present a message or prompt to the user indicating that a subscription to a first travel services rate category corresponds to a first subscription fee, which provides the user with options to reserve 3-night stays at a time in hotels that are part of a first collection and 2-night stays at a time in hotels that are part of a second collection. Similarly, the travel service registration module 250 may present a message or prompt to the user indicating that a subscription to a second travel services rate category corresponds to a second subscription fee (higher than the first subscription fee), which provides the user with options to reserve 3-night stays at a time in hotels that are part of a second collection and 4-night stays at a time in hotels that are part of the first collection. The travel service registration module 250 receives a user selection of the travel services rate category and stores the travel services rate category in association with the subscription for the user in a database.

After finalizing the purchase of the subscription, the travel service registration module 250 completes and activates an account with the travel services system 124 for the user. The user can then log into the travel services system 124, via the travel service registration module 250, to begin searching for and reserving travel services.

The travel service search module 240 may communicate with the client device 110 to receive travel information including parameters and criteria for a new travel service request from a subscriber after the subscriber logs into the travel services system 124. For example, via the graphical user interface of the client device 110, the user can select a travel destination or geographical location and can, optionally, input the desired trip start date, end date, and/or trip length. The travel service search module 240 may communicate this user selection to the travel services availability module 210 to identify a list of available travel services within a travel service rate category associated with a user's subscription. The travel service search module 240 may communicate an identifier of the user of the client device 110 to the travel service rate category module 230.

In some embodiments, after the travel service search module 240 receives travel information from the subscriber, the travel service search module 240 communicates with the travel service rate category module 230 to determine the travel services rate category associated with the user's subscription. The travel service rate category module 230 retrieves the travel services rate category associated with the user's subscription and provides the parameters associated with the retrieved travel services rate category to the travel service search module 240. For example, the travel service rate category module 230 may determine that the subscriber is associated with a subscription that corresponds to a first travel services rate category and not a second travel services rate category. The first travel services rate category may correspond to travel services having a first predetermined duration (e.g., 3-nights) and the second travel services rate category may correspond to travel services having a second predetermined duration (e.g., 2-nights). In some cases, the first travel services rate category may correspond to travel services in a first collection (e.g., hotels associated with a first collection of brands) and the second travel services rate category may correspond to travel services in a second collection (e.g., hotels associated with a second collection of brands). The travel service rate category module 230 may provide these parameters (e.g., number of nights available and/or identification of the collection of the travel services) of the travel services rate category to which the user subscribes to the travel service search module 240.

In some embodiments, the travel service rate category module 230 may determine that the subscription corresponds to the first travel services rate category. In response, the travel service rate category module 230 may determine that the first travel services rate category corresponds to a first predetermined duration for a first collection of travel services and a second (shorter) predetermined duration for a second collection of travel services. For example, the travel service rate category module 230 may determine that the first travel services rate category entitles the subscriber to reserve 3-nights at hotels that are part of a first set of hotel brands and to reserve 2-nights at hotels that are part of a second set of hotel brands. The travel service rate category module 230 may provide this information as the parameters to the travel service search module 240.

In some embodiments, the travel service search module 240 determines whether the travel information input by the user in the graphical user interface as the search criteria satisfies the parameters of the travel services rate category of the user's subscription. For example, the user may request a three-night stay at hotels that are part of a second collection (e.g., a three-night stay at 4 star hotels). The travel service search module 240 may determine that the parameters of the travel services rate category of the user's subscription enables the user to reserve three-night stays at hotels that are part of a first collection and two-night stays at hotels that are part of the second collection. In such cases, the travel service search module 240 may determine that the travel information input by the user fails to satisfy the parameters of the rate category of the user's subscription. Namely, the subscription may allow the user to reserve two-night stays at 4 star hotels but not three-nights as requested by the user. In response to this determination, the travel service search module 240 may ask the user to adjust the travel information by reducing the requested travel duration and/or by selecting a different collection of travel services (e.g., travel services associated with a lower tier rate category). After the travel service search module 240 verifies that the travel search parameters input by the user match or satisfy the parameters of the travel services rate category in the user's subscription, the travel service search module 240 proceeds to communicate with the travel services availability module 210 to retrieve a list of available travel services.

The travel service search module 240 computes a geographic region based on the travel information entered by the user. For example, the travel service search module 240 may determine a destination that is specified by the user and may compute a 10 mile radius of that destination as the geographic region. The travel service search module 240 communicates the travel service rate category of the subscriber, the travel duration or dates input by the user, the parameters provided by the travel service rate category module 230, and/or the geographic region to the travel services availability module 210. The travel services availability module 210 identifies a list of travel services that are located within the geographic region and that are available for consumption during the period specified by the travel dates input by the user. For example, the travel services availability module 210 identifies a list of hotels associated with one or more brands corresponding to a first travel services rate category that have empty rooms or rooms available during the dates specified by the user in the travel information. The travel services availability module 210 communicates the identified list of travel services to the travel service presentation module 260.

In some cases, the travel services availability module 210 also identifies a list of hotels associated with one or more brands corresponding to a second travel services rate category (that is a higher tier than the first travel services rate category of the user's subscription) that have empty rooms or rooms available during one or more less days than the duration of time specified by the user in the travel information. Specifically, the travel services availability module 210 identifies a first set of hotels that are in a first collection of hotels corresponding to the travel services rate category in the user's subscription and that have rooms available for the user to stay during a time period corresponding to the time period requested by the user. The travel services availability module 210 also identifies a second set of hotels that are in a second collection of hotels corresponding to a higher tier travel services rate category than that in the user's subscription and that have rooms available for the user to stay during a shorter time period than the time period requested by the user. For example, if the user requested a three-night length of stay in a particular region or destination and the user's subscription corresponds to a first travel services rate category, the travel services availability module 210 identifies a list of hotels corresponding to the first travel services rate category, within the particular region, that have availability during the dates specified by the user for a three-night stay. The travel services availability module 210 also identifies a list of hotels corresponding to a second travel services rate category, within the particular region, that have availability during the dates specified by the user for a two-night stay.

In some cases, the travel services availability module 210 also identifies a list of hotels associated with one or more brands corresponding to a third travel services rate category (that is a lower tier than the first travel services rate category of the user's subscription) that have empty rooms or rooms available during one or more additional days than the duration of time specified by the user in the travel information. Specifically, the travel services availability module 210 identifies a first set of hotels that are in a first collection of hotels corresponding to the travel services rate category in the user's subscription and that have rooms available for the user to stay during a time period corresponding to the time period requested by the user. The travel services availability module 210 also identifies a third set of hotels that are in a third collection of hotels corresponding to a lower tier travel services rate category than that in the user's subscription and that have rooms available for the user to stay during a longer time period than the time period requested by the user. For example, if the user requested a three-night length of stay in a particular region or destination and the user's subscription corresponds to a first travel services rate category, the travel services availability module 210 identifies a list of hotels corresponding to the first travel services rate category, within the particular region, that have availability during the dates specified by the user for a three-night stay. The travel services availability module 210 also identifies a list of hotels corresponding to a third travel services rate category, within the particular region, that have availability during a longer period of time than the dates specified by the user (e.g., hotels that are available for a four-night stay).

The travel service presentation module 260 presents the identified list of travel services to a subscriber. In some cases, the travel service presentation module 260 displays an indicator that visually distinguishes the travel services that are associated with a first rate category from travel services associated with a second rate category that is of a higher or lower tier than the first rate category. Specifically, the indicator visually distinguishes travel services that corresponds to the travel services rate category in the user's subscription from travel services associated with a rate category that is higher/lower than the rate category that corresponds to the travel services rate category in the user's subscription. For example, the travel service presentation module 260 may highlight or box in green those identified available travel services that correspond to the travel services rate category in the user's subscription, may highlight in yellow travel services associated with a rate category that is lower than the rate category that corresponds to the travel services rate category in the user's subscription, and may highlight in red travel services associated with a rate category that is higher than the rate category that corresponds to the travel services rate category in the user's subscription.

In some cases, the travel service presentation module 260 displays an option to extend a given duration for one or more travel services that are presented to the user and that are associated with a rate category that is higher than the rate category that corresponds to the travel services rate category in the user's subscription. In some cases, the option to extend is only presented when such travel services are provided as available to reserve for a shorter duration than the duration requested by the user in the travel information input to the travel service search module 240. For example, the user may be searching for hotels to stay in for three-nights and may have a subscription for a first hotel rate category. In such circumstances, the travel service presentation module 260 may present hotels in the first rate category that are available for the user to reserve for the requested three-night stay and may simultaneously present hotels in a second (higher) rate category that are available for the user to reserve for less time than that requested (e.g., for a two-night stay). In this case, the travel service presentation module 260 may present an option to extend for the hotels in the second rate category to allow the user to reserve the hotels in the second rate category and purchase additional time or nights in those hotels to extend the stay in those hotels to match the duration requested by the user (e.g., three nights).

In some cases, the option to extend may be associated with a fee (e.g., a per night fee or per stay fee) that increases in proportion to the amount of time the user requests to extend the duration of the travel service. The fee may be computed based on the market off-the-shelf cost for consuming the travel service on the dates requested by the user.

In response to the user selecting the option to extend, the requested travel service is reserved for the entire duration requested by the user (e.g., three-nights) and the user is only charged the fee for the additional time. Namely, the two-night stay at the requested travel service is included in the user's subscription and the user need only purchase the one additional night stay by selecting the option to extend.

The travel service presentation module 260 receives a user selection of a given travel service that is listed. In response, the travel service presentation module 260 communicates an identifier of the travel service to the travel service reservation module 252. Travel service reservation module 252 retrieves personal information that has previously been collected and stored in a profile for the user. The travel service reservation module 252 communicates the personal information of the user to the corresponding travel service and specifies the range of dates requested for the reservation. For example, the travel service reservation module 252 stores, in a database that manages reservations for the requested travel service, the name and address of the requesting subscriber and timeframe for the reservation. In some implementations, the travel service reservation module 252 contacts the hotel brand corresponding to the selected travel service and requests that the hotel brand reserve a hotel room corresponding to the selected travel service for the subscriber on the requested dates of travel. The reservation or booking of the travel service is performed seamlessly and automatically for the user in response to the user selecting the travel service or an option to reserve the travel service and without navigating the user through a checkout process or collecting billing information from the user.

Figure 3:
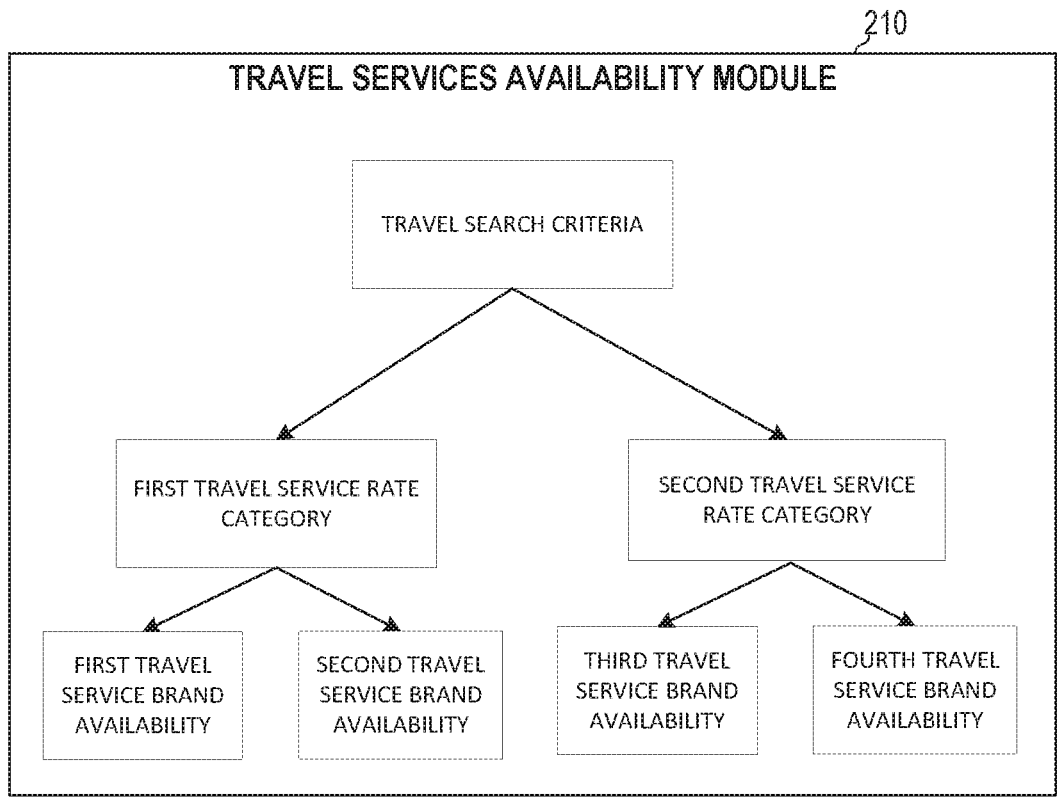

FIG. 3 illustrates a travel services availability module 210 of the travel services system 124, according to some example embodiments. In some embodiments, the travel services availability module 210 receives travel search criteria from the travel service search module 240. The travel search criteria may include the travel service rate category of a user's subscription, parameters of the travel service rate category, dates of travel, length of stay, one or more geographical locations and/or a threshold distance of the locations, and/or other suitable information.

The travel services availability module 210 maintains availability information across various travel services of various types or of the same type. For example, the travel services availability module 210 maintains hotel room availability information for various hotels of multiple brands and of multiple hotel rate categories. The travel services availability module 210 may have direct access to the availability information from each of the travel services and/or may query, on a real-time basis or periodic basis, a database of availability for each travel service. In some implementations, the travel services availability module 210 communicates with a website associated with each hotel on a periodic basis (e.g., nightly, hourly, or other suitable timeframe) to determine the availability information at the hotel over the next 12 months. The travel services availability module 210 updates a database in which the availability information of the various travel services is stored to indicate which date(s) each given travel service is available.

The travel services availability module 210 may determine the travel service rate category of a user's subscription based on the received travel search criteria. In response, the travel services availability module 210 selects a rate category in which to search for travel services. For example, the travel services availability module 210 may determine that the travel service rate category in the user's subscription is a first travel service rate category. In response, the travel services availability module 210 identifies first and second travel service brands that correspond to the first travel service rate category. Each brand may be associated with one or more travel services of that brand. For example, a luxury brand under the first travel service rate category may be associated with a first collection of luxury travel services (e.g., hotels) and a standard brand under the first travel service rate category may be associated with a second collection of standard travel services. The travel services availability module 210 determines which travel services within the first and second brands have availability on the date(s) received in the travel search criteria. The travel services availability module 210 retrieves those travel services as the identified travel services that correspond to the travel search criteria. In some implementations, the travel services availability module 210 also receives a brand selection in the travel search criteria, in which case, the travel services availability module 210 filters out any travel service that is identified that is not within the collection of travel services of the selected brand.

In some embodiments, the travel services availability module 210 may reduce a length of stay or duration of travel received in the travel search criteria in response to determining that the travel service rate category of the user's subscription is the first travel service rate category that is of a lower tier than a second travel service rate category. For example, the travel services availability module 210 may determine that the travel search criteria includes a three-night length of stay and, in such cases, the travel services availability module 210 may reduce the length of stay to two nights. Then, the travel services availability module 210 searches the third and fourth travel service brands under the second travel service rate category for travel services that have availability in the reduced length of stay (e.g., two nights). The travel services availability module 210 retrieves those travel services as the identified travel services that correspond to the travel search criteria. The travel services availability module 210 also searches the first and second travel service brands under the first travel service rate category for travel services that have availability in the requested length of stay (e.g., three nights). In an implementations, the travel services availability module 210 returns a combination of the travel services with the requested length of stay that are part of a collection within the first travel service rate category and the travel services with a reduced length of stay that are part of a collection within the second (higher tier) travel service rate category.

In some embodiments, the travel services availability module 210 may increase a length of stay or duration of travel received in the travel search criteria in response to determining that the travel service rate category of the user's subscription is the second travel service rate category that is of a higher tier than the first travel service rate category. For example, the travel services availability module 210 may determine that the travel search criteria includes a three-night length of stay and, in such cases, the travel services availability module 210 may increase the length of stay to four nights. Then, the travel services availability module 210 searches the first and second travel service brands under the first travel service rate category for travel services that have availability in the increased length of stay (e.g., four nights). The travel services availability module 210 retrieves those travel services as the identified travel services that correspond to the travel search criteria. The travel services availability module 210 also searches the third and fourth travel service brands under the second travel service rate category for travel services that have availability in the requested length of stay (e.g., three nights). The travel services availability module 210 retrieves those travel services as the identified travel services that correspond to the travel search criteria. In an implementation, the travel services availability module 210 returns a combination of the travel services with the requested length of stay that are part of a collection within the first travel service rate category and the travel services with a reduced length of stay that are part of a collection within the second (higher tier) travel service rate category.

In some embodiments, the travel services availability module 210 ranks and/or sorts the combined list of travel services based on various factors, such as number of stars, number of reviews, type of reviews, distance to the location specified in the travel search criteria, whether the subscriber previously consumed the travel service, user profile information, and/or other suitable criteria.

Figure 4:
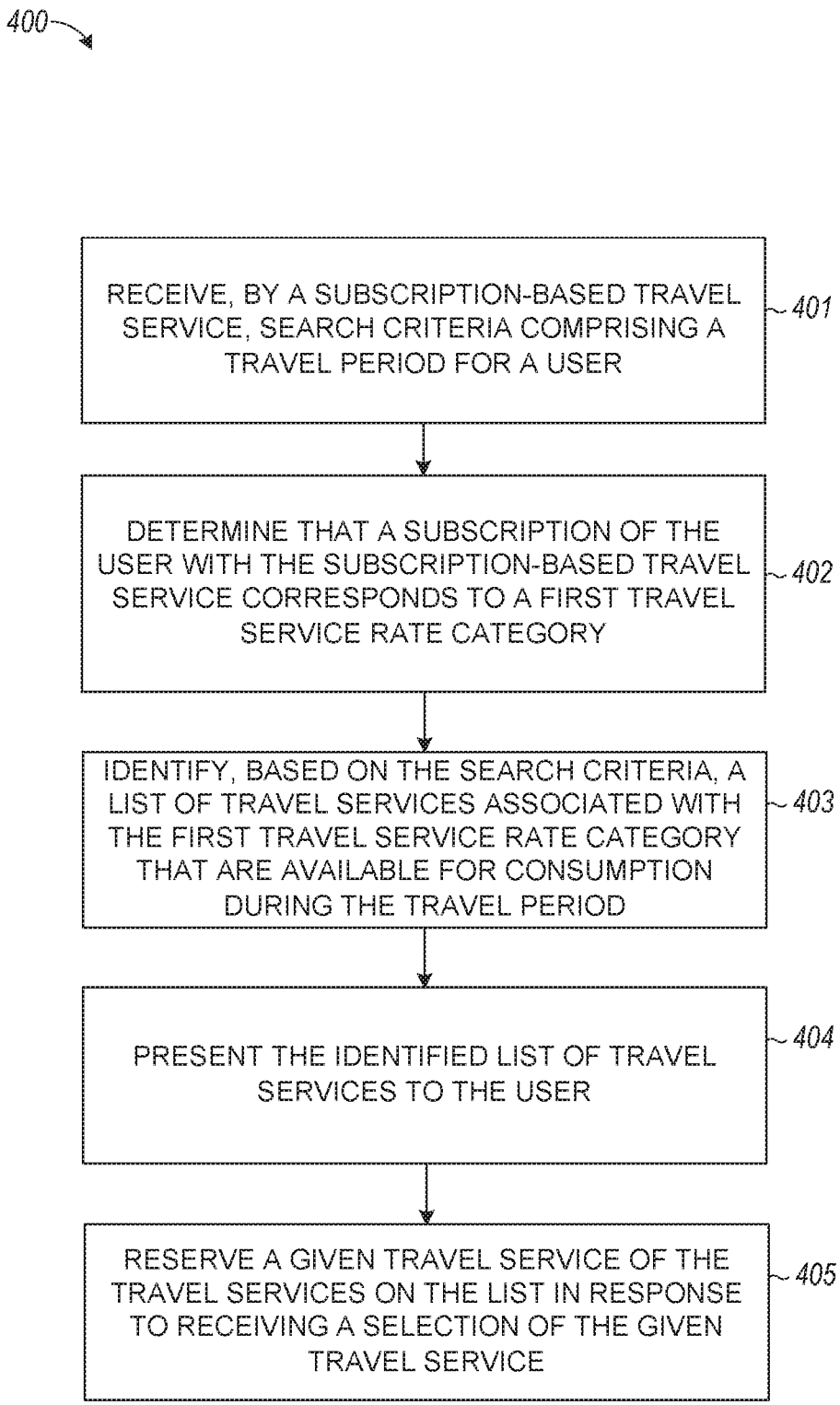
FIG. 4 illustrates a flow diagram of a process of the travel services system, according to some example embodiments.

FIG. 4 illustrates a flow diagram of a process of the travel services system 124, according to some example embodiments. The process 400 may be embodied in computer-readable instructions for execution by one or more processors such that the operations of the process 400 may be performed in part or in whole by the functional components of the server system 108; accordingly, the process 400 are described below by way of example with reference thereto. However, in other embodiments at least some of the operations of the process 400 may be deployed on various other hardware configurations. The process 400 are therefore not intended to be limited to the server system 108 and can be implemented in whole, or in part, by any other component. Any operation in the process 400 can be performed in any order or entirely omitted and skipped.

At operation 401, a computing system (e.g., server system 108) of a subscription-based travel service receives search criteria comprising a travel period for a user.

At operation 402, the computing system determines that a subscription of the user with the subscription-based travel service corresponds to a first travel service rate category.

At operation 403, the computing system identifies, based on the search criteria, a list of travel services associated with the first travel service rate category that are available for consumption during the travel period.

At operation 404, the computing system presents the identified list of travel services to the user.

At operation 405, the computing system reserves a given travel service of the travel services on the list in response to receiving a selection of the given travel services.

Figure 5:
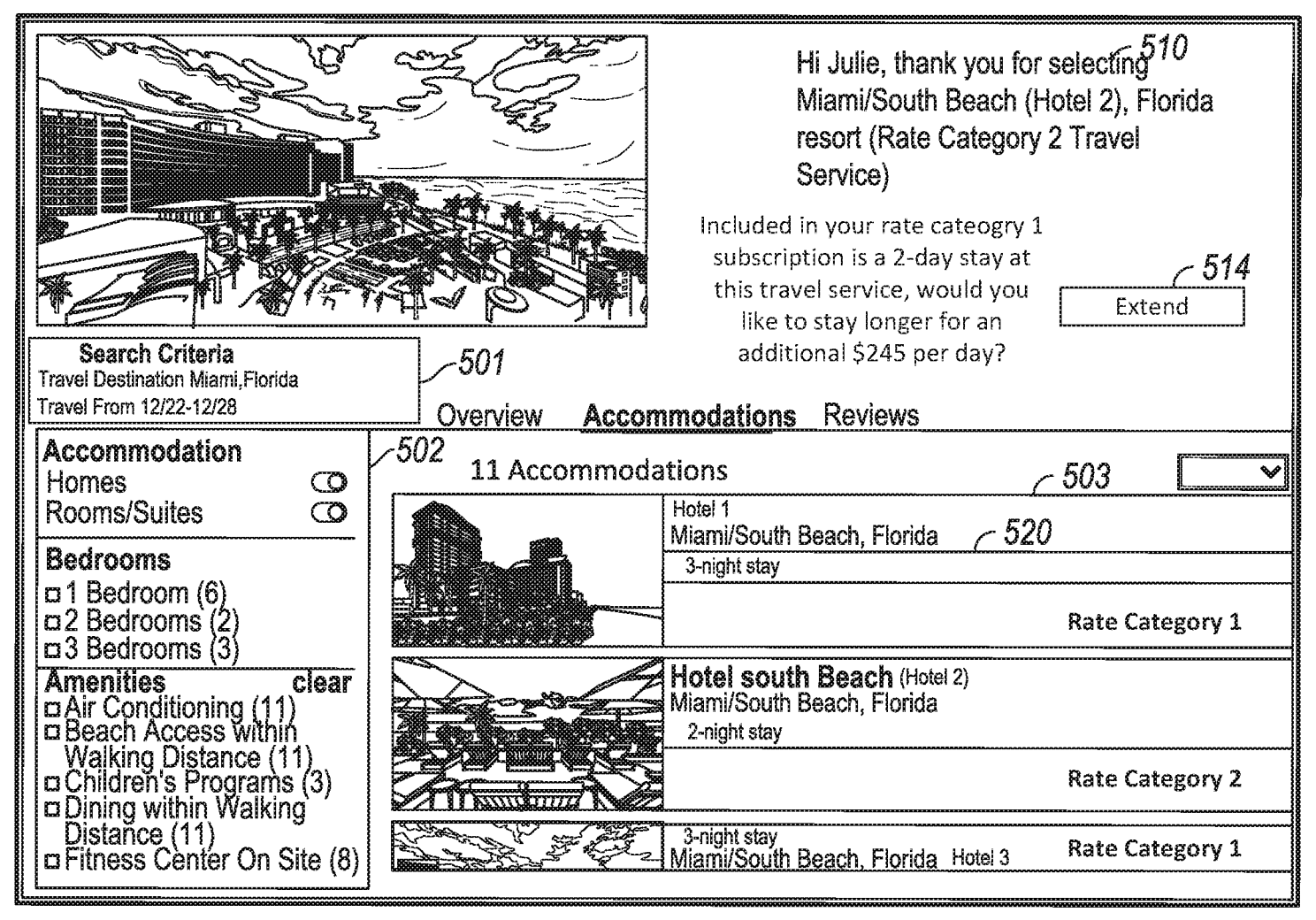

FIG. 5 is an illustrative graphical user interface of the travel services system 124, according to some example embodiments. As shown in FIG. 5, a user named Julie may access the travel services system 124. As shown in FIG. 5, after the user Julie activates the subscription, the user (Julie) can input travel search criteria 501. This travel search criteria 501 may include various parameters 502 including a travel destination, distance to the destination, start date of the travel, end date of the travel, length of stay, number of days in the trip, quality of the travel services, and/or any combination thereof. The travel services system 124 processes the travel search criteria and automatically generates a list of matching travel services for presentation using one or more interactive visual representations 503.

In some embodiments, the list of travel services includes travel services associated with a first travel services rate category and travel services associated with a second travel services rate category. In such cases, the list of travel services may indicate the travel period 520 that is included in the user's subscription and for which the user can reserve a given travel service on the list. In some cases, travel services associated with higher rate categories than the travel services rate category in the user's subscription are presented with shorter travel periods than travel services associated with the travel services rate category in the user's subscription. In some cases, travel services associated with lower rate categories than the travel services rate category in the user's subscription are presented with longer travel periods than travel services associated with the travel services rate category in the user's subscription.

The travel services system 124 may present indicators with each displayed travel service to visually distinguish the travel services in the list based on the travel services rate category associated with the travel service. For example, a first visual indicator (e.g., the text "rate category 1") may be displayed together with each travel service associated with the first travel services rate category. A second visual indicator (e.g., the text "rate category 2") may be displayed together with each travel service associated with the second travel services rate category.

A user can select any one of the interactive visual representations 503 to instruct the travel services system 124 to complete a reservation for the corresponding travel service (e.g., book a hotel room) associated with the selected visual representation. In some embodiments, the travel services system 124 may determine that the user Julie selected a given travel service when the user taps or selects the visual representation 503. In response, the travel services system 124 presents a message 510 that identifies the travel service selected by the user. The message 510 informs the user about the travel services rate category of the selected travel service. The message 510 also informs the user about the rate category associated with the subscription of the user.

In some cases, the travel services system 124 may determine that the rate category of the travel service the user selects is of a higher tier (e.g., the second travel services rate category) than the rate category included in the user's subscription. For example, the user Julie may have a subscription that allows the user to reserve travel services that are in a first travel services rate category for a first duration (e.g., three nights). But the selected travel service may be in a second travel services rate category for which the user is allowed to reserve travel services for a second duration shorter than the first (e.g., two nights). In response, the travel services system 124 may inform the user in message 510 that included in the rate category 1 subscription of the user is a two-night stay at the second rate category travel service and may provide an option 514 for the user to extend the stay by a specified amount of time (e.g., one, two, or any number of additional nights/days). The message 510 may indicate the fee for extending the selected travel services. This fee may be computed by the travel services extension module 270 based on a margin, previously stored costs of the travel service, and/or by accessing a website or source of the travel service. In response to receiving a user selection of option 514, the travel services system 124 may book the travel service for the user Julie for the requested three nights by charging the user Julie for one additional night beyond the two nights that are included in the subscription.

Figure 6:
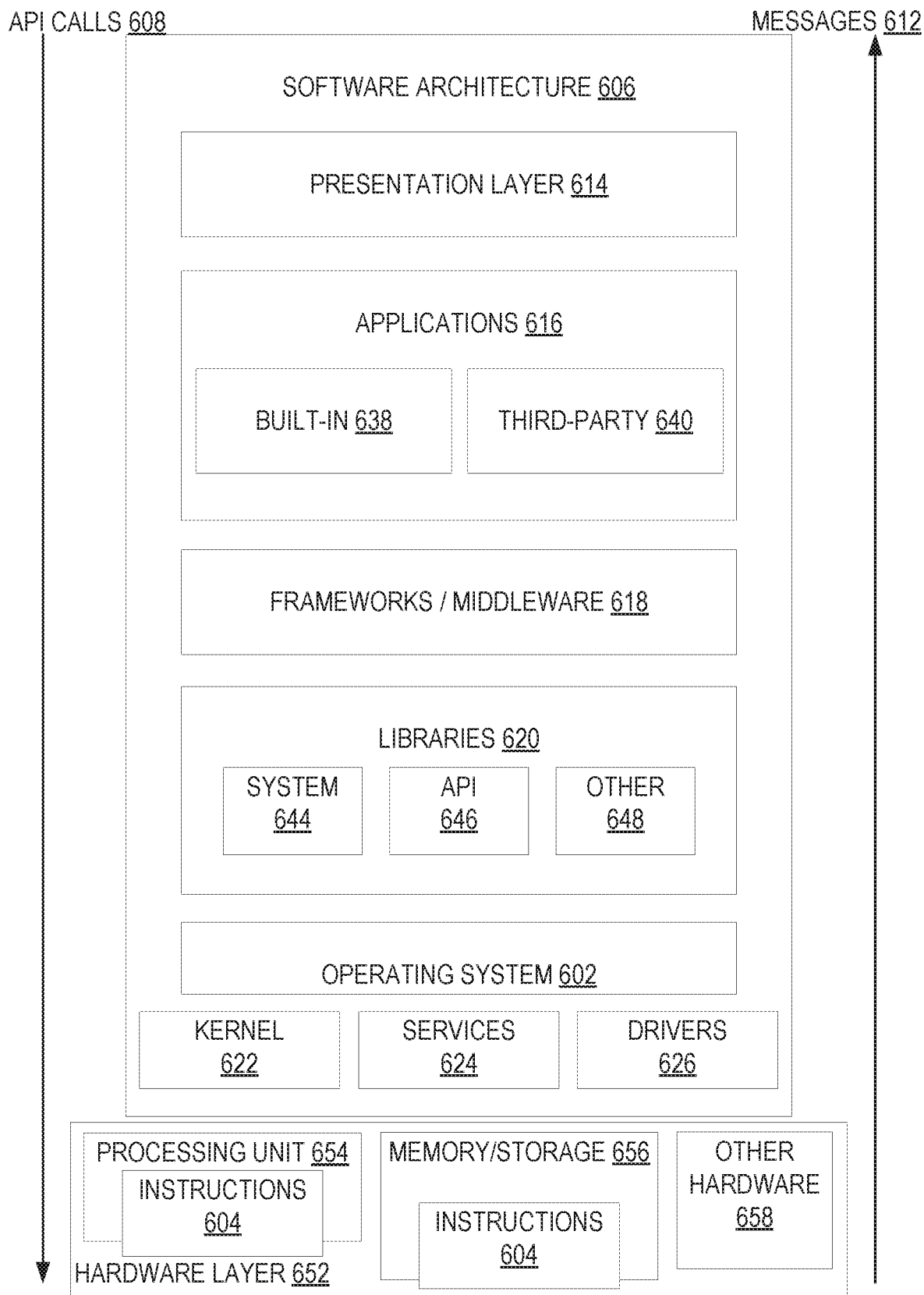
FIG. 6 is a block diagram illustrating an example of a software architecture that may be installed on a machine, according to some example embodiments.

FIG. 6 is a block diagram illustrating software architecture 606, which can be installed on any one or more of the devices described above. For example, in various embodiments, client devices 110 and servers and systems 130, 108, 120, 122, and 124 may be implemented using some or all of the elements of software architecture 606. FIG. 6 is merely a non-limiting example of a software architecture, and it will be appreciated that many other architectures can be implemented to facilitate the functionality described herein. In various embodiments, the software architecture 606 is implemented by hardware (including a hardware layer 652 with processing unit 654, memory/storage 656, and other hardware 658) such as machine 700 of FIG. 7 that includes processors 704, memory/storage 706, and input/output (I/O) components 718. As explained below, the processing unit 654 is configured to execute instructions 604 that are stored in memory/storage 656. In this example, the software architecture 606 can be conceptualized as a stack of layers where each layer may provide a particular functionality. For example, the software architecture 606 includes layers such as an operating system 602, libraries 620, frameworks 618, and applications 616, and presentation layer 614. Operationally, the applications 616 invoke API calls 608 through the software stack and receive messages 612 in response to the API calls 608, consistent with some embodiments.

In various implementations, the operating system 602 manages hardware resources and provides common services. The operating system 602 includes, for example, a kernel 622, services 624, and drivers 626. The kernel 622 acts as an abstraction layer between the hardware and the other software layers, consistent with some embodiments. For example, the kernel 622 provides memory management, processor management (e.g., scheduling), component management, networking, and security settings, among other functionality. The services 624 can provide other common services for the other software layers. The drivers 626 are responsible for controlling or interfacing with the underlying hardware, according to some embodiments. For instance, the drivers 626 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 620 provide a low-level common infrastructure utilized by the applications 616. The libraries 620 can include system libraries 644 (e.g., C standard library) that can provide functions such as memory allocation functions, string manipulation functions, mathematic functions, and the like. In addition, the libraries 620 can include API libraries 646 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 620 can also include a wide variety of other libraries 648 to provide many other APIs to the applications 616.

The frameworks 618 provide a high-level common infrastructure that can be utilized by the applications 616, according to some embodiments. For example, the frameworks 618 provide various graphic user interface functions, high-level resource management, high-level location services, and so forth. The frameworks 618 can provide a broad spectrum of other APIs that can be utilized by the applications 616, some of which may be specific to a particular operating system 602 or platform.

In an example embodiment, the applications 616 include built-in applications 638 including any one or more of a home application, a contacts application, a browser application, a book reader application, a location application, a media application, a messaging application, a game application, and a broad assortment of other applications such as a third-party application 640. According to some embodiments, the applications 616 are programs that execute functions defined in the programs. Various programming languages can be employed to create one or more of the applications 616, structured in a variety of manners, such as object-oriented programming languages (e.g., Objective-C, Java, or C++) or procedural programming languages (e.g., C or assembly language). In a specific example, the third-party application 640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 640 can invoke the API calls 608 provided by the operating system 602 to facilitate functionality described herein.

Some embodiments may particularly include a subscription-based travel services application. In certain embodiments, this may be a stand-alone application that operates to manage communications with a server system such as third-party servers 130 or server system 108. In other embodiments, this functionality may be integrated with another application. The subscription-based travel services application may request and display various data related to subscription-based travel services and may provide the capability for a user to input data related to the objects via a touch interface, keyboard, or using a camera device of machine 700, communication with a server system, and receipt and storage of object data in a memory/storage device. Presentation of information and user inputs associated with the information may be managed by a subscription-based travel services application using different frameworks 618, library 620 elements, or operating system 602 elements operating on a machine 700.

Figure 7:
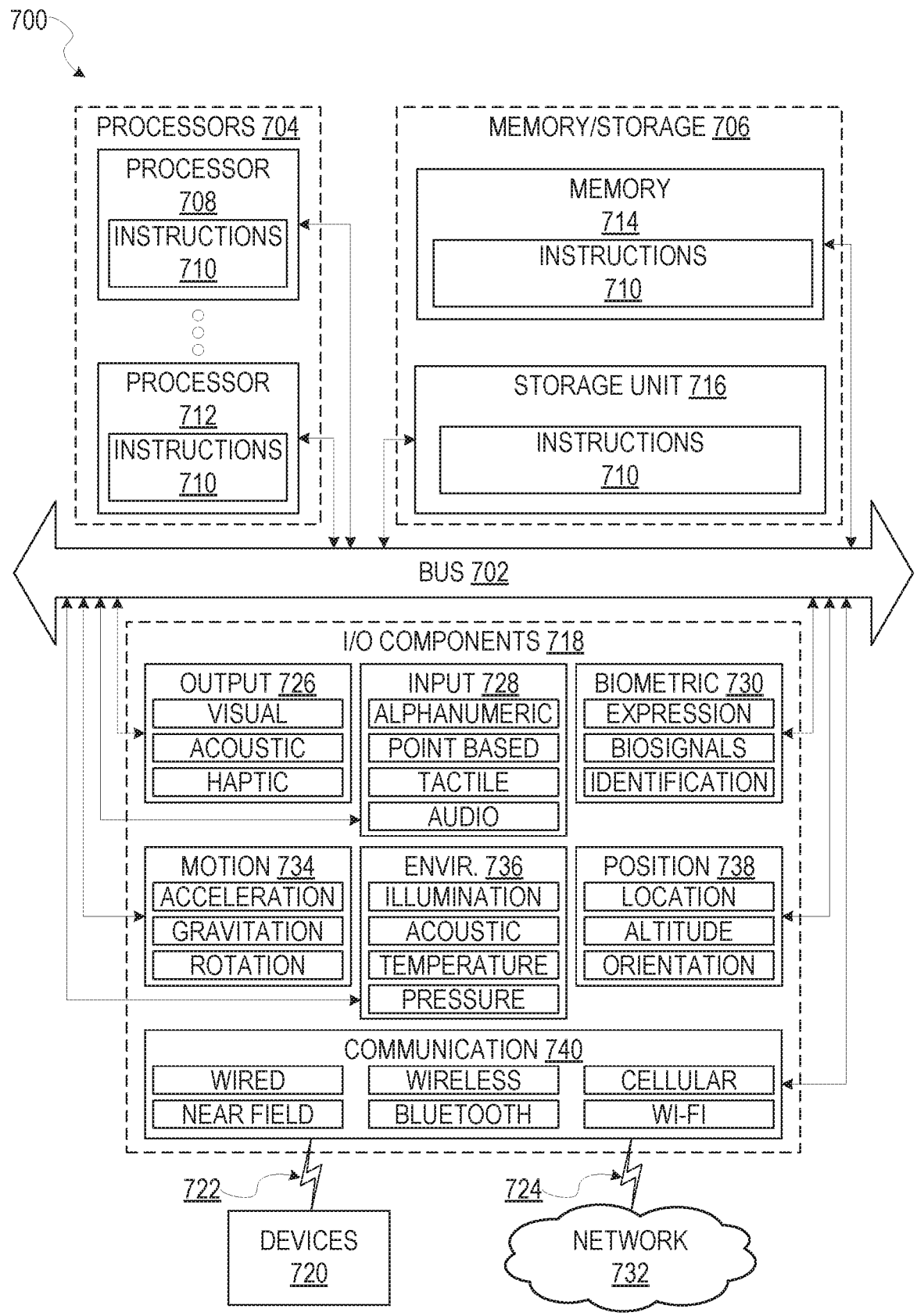
FIG. 7 illustrates a diagrammatic representation of a machine, in the form of a computer system, within which a set of instructions may be executed for causing the machine to perform any one or more of the methodologies discussed herein, according to an example embodiment.

FIG. 7 is a block diagram illustrating components of a machine 700, according to some embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application 616, an apples, an app, or other executable code) for causing the machine 700 to perform any one or more of the methodologies discussed herein can be executed. In alternative embodiments, the machine 700 operates as a standalone device or can be coupled (e.g., networked) to other machines. In a networked deployment, the machine 700 may operate in the capacity of a server machine 130, 108, 120, 122, 124, and the like, as a client device 110 in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by the machine 700. Further, while only a single machine 700 is illustrated, the term "machine" shall also be taken to include a collection of machines 700 that individually or jointly execute the instructions 710 to perform any one or more of the methodologies discussed herein.

In various embodiments, the machine 700 comprises processors 704, memory 714, and I/O components 718, which can be configured to communicate with each other via a bus 702. In an example embodiment, the processors 704 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 708 and a processor 712 that may execute the instructions 710. The term "processor" is intended to include multi-core processors 704 that may comprise two or more independent processors 704 (also referred to as "cores") that can execute instructions 710 contemporaneously. Although FIG. 7 shows multiple processors 704, the machine 700 may include a single processor 704 with a single core, a single processor 704 with multiple cores (e.g., a multi-core processor 704), multiple processors 704 with a single core, multiple processors 704 with multiples cores, or any combination thereof.

The memory/storage 706 comprises a main memory 714, a static memory, and a storage unit 716 accessible to the processors 704 via the bus 702, according to some embodiments. The storage unit 716 can include a machine-readable medium on which are stored the instructions 710 embodying any one or more of the methodologies or functions described herein. The instructions 710 can also reside, completely or at least partially, within the main memory 714, within the static memory, within at least one of the processors 704 (e.g., within the processor's cache memory), or any suitable combination thereof, during execution thereof by the machine 700. Accordingly, in various embodiments, the main memory 714, the static memory, and the processors 704 are considered machine-readable media.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium is shown, in an example embodiment, to be a single medium, the term "machine-readable medium" should be taken to include a single medium or multiple media (e.g., a centralized or distributed database, or associated caches and servers) able to store the instructions 710. The term "machine-readable medium" shall also be taken to include any medium, or combination of multiple media, that is capable of storing instructions (e.g., instructions 710) for execution by a machine (e.g., machine 700), such that the instructions 710, when executed by one or more processors of the machine 700 (e.g., processors 704), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 718 include a wide variety of components to receive input, provide output, produce output, transmit information, exchange information, capture measurements, and so on. In general, it will be appreciated that the I/O components 718 can include many other components that are not shown in FIG. 7. The I/O components 718 are grouped according to functionality merely for simplifying the following discussion, and the grouping is in no way limiting. In various example embodiments, the I/O components 718 include output components 726 and input components 728. The output components 726 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 728 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone and the like.

In some further example embodiments, the I/O components 718 include biometric components 730, motion components 734, environmental components 736, or position components 738, among a wide array of other components. For example, the biometric components 730 include components to detect expressions (e.g., hand expressions, facial expressions, vocal expressions, body gestures, or eye tracking), measure biosignals (e.g., blood pressure, heart rate, body temperature, perspiration, or brain waves), identify a person voice identification, retinal identification, facial identification, fingerprint identification, or electroencephalogram based identification), and the like. The motion components 734 include acceleration sensor components (e.g., accelerometer), gravitation sensor components, rotation sensor components (e.g., gyroscope), and so forth. The environmental components 736 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 738 include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 718 may include communication components 740 operable to couple the machine 700 to a network 732 or devices 720 via a coupling 724 and a coupling 722, respectively. For example, the communication components 740 include a network interface component or another suitable device to interface with the network 732. In further examples, communication components 740 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 720 may be another machine 700 or any of a wide variety of peripheral devices (e.g., a peripheral device coupled via a USB).

Moreover, in some embodiments, the communication components 740 detect identifiers or include components operable to detect identifiers. For example, the communication components 740 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 740, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 732 can be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a WI-FI® network, another type of network, or a combination of two or more such networks. For example, the network 732 or a portion of the network 732 may include a wireless or cellular network, and the coupling 724 may be a Code Division Multiple Access (CDMA) connection, a Global System for Mobile communications (GSM) connection, or another type of cellular or wireless coupling. In this example, the coupling 722 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 710 are transmitted or received over the network 732 using a transmission medium via a network interface device (e.g., a network interface component included in the communication components 740) and utilizing any one of a number of well-known transfer protocols (e.g., Hypertext Transfer Protocol (HTTP)). Similarly, in other example embodiments, the instructions 710 are transmitted or received using a transmission medium via the coupling 722 (e.g., a peer-to-peer coupling) to the devices 720. The term "transmission medium" shall be taken to include any intangible medium that is capable of storing, encoding, or carrying the instructions 710 for execution by the machine 700, and includes digital or analog communications signals or other intangible media to facilitate communication of such software.

Furthermore, the machine-readable medium is non-transitory (in other words, not having any transitory signals) in that it does not embody a propagating signal. However, labeling the machine-readable medium "non-transitory" should not be construed to mean that the medium is incapable of movement; the medium should be considered as being transportable from one physical location to another. Additionally, since the machine-readable medium is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:

receiving, by one or more processors of a subscription-based travel service, search criteria comprising a travel period for a user;

determining that a subscription of the user with the subscription-based travel service corresponds to a first travel service rate category;

identifying, by the one or more processors, a specified period of time associated with the first travel service rate category, the first travel service rate category enables the user to reserve, for consumption during the specified period of time, any one of a plurality of travel services associated with the first travel service rate category without charging the user any additional fees beyond a subscription fee;

retrieving training data comprising data associated with a plurality of training users from a storage device, wherein the training data comprises known travel services activities of the plurality of training users;

training a machine learning technique to process the training data comprising the known travel services activities of the plurality of users, the training being performed by establishing a relationship between: (1) the training data comprising the known travel services activities of the plurality of training users; and (2) known or manually assigned classifications to the plurality of training users;

based on a travel service activity associated with the user, determining, using the established relationship, a classification for the user;

identifying, based on the search criteria and the determined classification of the user, a list of travel services of the plurality of travel services associated with the first travel service rate category that are available for consumption during the specified period of time associated with the first travel service rate category;

presenting the identified list of travel services to the user;

reserving a given travel service of the travel services on the list in response to receiving a selection of the given travel service; and preventing the user from reserving additional travel services until the reserved travel service expires or is consumed by the user.

2. The computer-implemented method of claim 1, further comprising:

presenting an option to purchase an increase to the specified period of time by a predetermined duration to equal a second specified period of time associated with a second travel service rate category; and enabling the user to reserve a different travel service from another list of travel services associated with the second travel service rate category for consumption during the second specified period of time in response to receiving selection of the option to purchase the increase.

3. The computer-implemented method of claim 1, wherein the travel services comprise at least one of hotels, rental cars, airfares, homes/residences, experiential travel, guided tours, cruises, train fares, private aviation, bespoke travel, event-based travel, or space travel.

4. The computer-implemented method of claim 1, wherein the subscription of the user allows the user to reserve, for a subscription fee, for consumption during a predetermined time period, any travel service associated with the first travel service rate category.

5. The computer-implemented method of claim 1, further comprising receiving registration information from the user to subscribe to the subscription-based travel service, the registration information comprising a selection of the first travel service rate category from a plurality of travel service rate categories.

6. The computer-implemented method of claim 5, wherein:
   the first travel service rate category allows the user to reserve, for a first subscription fee, for consumption during a first predetermined time period comprising the specified period of time, any travel service associated with the first travel service rate category; and
   a second travel service rate category of the plurality of travel service rate categories allows the user to reserve, for a second subscription fee:
      for consumption during the first predetermined time period, any travel service associated with the second travel service rate category; and
      for consumption during a second predetermined period of time, any travel service associated with the first travel service rate category.

7. The computer-implemented method of claim 1, wherein the first travel service rate category is a first hotel rate category associated with a hotel chain entity, the hotel chain entity comprising a plurality of different hotel brands each associated with one of a plurality of hotel rate categories, each hotel brand comprising one or more hotels, wherein identifying the list of travel services associated with the first travel service rate category comprises:
   identifying a first set of the plurality of different hotel brands that is associated with the first hotel rate category; and
   enabling the user to reserve, for a first predetermined number of nights, a stay at any hotel within the first set of the plurality of different hotel brands.

8. The computer-implemented method of claim 7, further comprising:
   identifying a second set of the plurality of different hotel brands that is associated with a second hotel rate category of the plurality of hotel rate categories; and
   enabling the user to reserve, for a second predetermined number of nights, a stay at any hotel within the second set of the plurality of different hotel brands.

9. The computer-implemented method of claim 8, wherein the second predetermined number of nights is less than the first predetermined number of nights.

10. The computer-implemented method of claim 8, further comprising presenting an option to purchase additional nights to increase the second predetermined number of nights by an amount to equal the first predetermined number of nights.

11. The computer-implemented method of claim 10, further comprising:
   adding time to the second predetermined number of nights in response to receiving a selection of the option; and
   charging an account of the user a fee in response to receiving the selection of the option.

12. The computer-implemented method of claim 8, further comprising:
   simultaneously presenting the first set of the plurality of different hotel brands and the second set of the plurality of different hotel brands; and
   presenting a visual indicator to visually distinguish the identified first set of the plurality of different hotel brands from the identified second set of the plurality of different hotel brands.

13. The computer-implemented method of claim 1, wherein identifying the list of travel services associated with the first travel service rate category comprises identifying travel services that are within a threshold distance of a location specified in the search criteria.

14. The computer-implemented method of claim 1, further comprising excluding from the list of travel services any travel service that is unavailable during the travel period.

15. A system comprising:
   a memory that stores instructions; and
   one or more processors on a server configured by the instructions to perform operations comprising:
   receiving, by a subscription-based travel service, search criteria comprising a travel period for a user;
   determining that a subscription of the user with the subscription-based travel service corresponds to a first travel service rate category;
   identifying a specified period of time associated with the first travel service rate category, the first travel service rate category enables the user to reserve, for consumption during the specified period of time, any one of a plurality of travel services associated with the first travel service rate category without charging the user any additional fees beyond a subscription fee;
   retrieving training data comprising data associated with a plurality of training users from a storage device, wherein the training data comprises known travel services activities of the plurality of training users;
   training a machine learning technique to process the training data comprising the known travel services activities of the plurality of users, the training being performed by establishing a relationship between: (1) the training data comprising the known travel services activities of the plurality of training users; and (2) known or manually assigned classifications to the plurality of training users;
   based on a travel service activity associated with the user, determining, using the established relationship, a classification for the user;
   identifying, based on the search criteria and the determined classification of the user, a list of travel services of the plurality of travel services associated with the first travel service rate category that are available for consumption during the specified period of time associated with the first travel service rate category;
   presenting the identified list of travel services to the user;
   reserving a given travel service of the travel services on the list in response to receiving a selection of the given travel service; and
   preventing the user from reserving additional travel services until the reserved travel service expires or is consumed by the user.

16. The system of claim 15, further comprising operations for:
   presenting an option to purchase an increase to the specified period of time by a predetermined duration to equal a second specified period of time associated with a second travel service rate category; and
   enabling the user to reserve a different travel service from another list of travel services associated with the second travel service rate category for consumption during the second specified period of time in response to receiving selection of the option to purchase the increase.

17. The system of claim 15, wherein identifying the list of travel services associated with the first travel service rate category comprises identifying travel services that are within a threshold distance of a location specified in the search criteria.

18. A non-transitory computer-readable medium comprising instructions stored thereon that are executable by at least one processor to cause a computing device to perform operations comprising:
receiving, by a subscription-based travel service, search criteria comprising a travel period for a user;
determining that a subscription of the user with the subscription-based travel service corresponds to a first travel service rate category;
identifying a specified period of time associated with the first travel service rate category, the first travel service rate category enables the user to reserve, for consumption during the specified period of time, any one of a plurality of travel services associated with the first travel service rate category without charging the user any additional fees beyond a subscription fee;
retrieving training data comprising data associated with a plurality of training users from a storage device, wherein the training data comprises known travel services activities of the plurality of training users;
training a machine learning technique to process the training data comprising the known travel services activities of the plurality of users, the training being performed by establishing a relationship between: (1) the training data comprising the known travel services activities of the plurality of training users; and (2) known or manually assigned classifications to the plurality of training users;
based on a travel service activity associated with the user, determining, using the established relationship, a classification for the user;
identifying, based on the search criteria and the determined classification of the user, a list of travel services of the plurality of travel services associated with the first travel service rate category that are available for consumption during the specified period of time associated with the first travel service rate category;
presenting the identified list of travel services to the user;
reserving a given travel service of the travel services on the list in response to receiving a selection of the given travel service; and
preventing the user from reserving additional travel services until the reserved travel service expires or is consumed by the user.

19. The non-transitory computer-readable medium of claim 18, wherein identifying the list of travel services associated with the first travel service rate category comprises identifying travel services that are within a threshold distance of a location specified in the search criteria.

20. The non-transitory computer-readable medium of claim 18, further comprising operations for:
presenting an option to purchase an increase to the specified period of time by a predetermined duration to equal a second specified period of time associated with a second travel service rate category; and
enabling the user to reserve a different travel service from another list of travel services associated with the second travel service rate category for consumption during the second specified period of time in response to receiving selection of the option to purchase the increase.

* * * * *